US012783631B2

(12) United States Patent
Liang et al.

(10) Patent No.: US 12,783,631 B2
(45) Date of Patent: Nov. 3, 2026

(54) COMMUNICATION SYSTEM, REMOTE TERMINAL UNIT, AND AUTHENTICATION METHOD THEREOF FOR ESTABLISHING TRUSTED DEVICE

(71) Applicant: Moxa Inc., New Taipei City (TW)

(72) Inventors: Chang-Wei Liang, New Taipei City (TW); Yi-Wei Chao, New Taipei City (TW)

(73) Assignee: Moxa Inc., New Taipei City (TW)

( * ) Notice: Subject to any disclaimer, the term of this patent is extended or adjusted under 35 U.S.C. 154(b) by 154 days.

(21) Appl. No.: 18/523,825

(22) Filed: Nov. 29, 2023

(65) Prior Publication Data

US 2025/0156520 A1 May 15, 2025

(30) Foreign Application Priority Data

Nov. 15, 2023 (TW) ................................. 112144033

(51) Int. Cl.
*H04L 9/40* (2022.01)
*G06F 21/44* (2013.01)

(52) U.S. Cl.
CPC .......... *G06F 21/44* (2013.01); *H04L 63/0823* (2013.01)

(58) Field of Classification Search
None
See application file for complete search history.

(56) References Cited

U.S. PATENT DOCUMENTS 9,660,994 B2 5/2017 McQuillan et al.
9,729,507 B2 8/2017 Fischer et al.
2004/0072580 A1* 4/2004 Honda .................. H04W 4/021 455/566
2012/0060209 A1 3/2012 Leu
2016/0036638 A1 2/2016 Campbell et al.
2016/0198391 A1* 7/2016 Orthmann ............. H04W 72/20 370/338
2018/0048639 A1* 2/2018 Wundsam ............... H04L 41/28
2018/0124028 A1* 5/2018 Fujimoto ............ H04L 63/0853
2018/0152837 A1 5/2018 Modzelewski et al.
(Continued)

FOREIGN PATENT DOCUMENTS

CN 111338663 6/2020
CN 116015999 4/2023
(Continued)

OTHER PUBLICATIONS

"Search Report of Europe Counterpart Application", issued on May 13, 2024, p. 1-p. 9.

*Primary Examiner* — Joshua Joo
(74) *Attorney, Agent, or Firm* — JCIPRNET

(57) ABSTRACT

A communication system, a remote terminal unit, and an authentication method thereof are provided. The remote terminal unit includes a processing module. The processing module includes a first processing unit and a first storage unit. The first storage unit is coupled to the first processing unit. In response to a trigger unit being enabled, the first processing unit operates in a provision mode to allow an input/output module and the processing module to establish trust. In response to the trigger unit being disabled, the first processing unit operates in a running mode to prohibit another input/output module that has not yet established trust from connecting with the processing module.

13 Claims, 8 Drawing Sheets

(56) References Cited

U.S. PATENT DOCUMENTS

| | | | | |
|---|---|---|---|---|
| 2018/0241739 | A1* | 8/2018 | Takazoe | G06F 21/44 |
| 2020/0059371 | A1* | 2/2020 | Rao | H04L 9/16 |
| 2020/0366686 | A1* | 11/2020 | Gaál | H04L 9/14 |
| 2023/0060447 | A1* | 3/2023 | Jayakumar | H04L 9/3247 |
| 2023/0209617 | A1* | 6/2023 | Kim | H04W 76/11<br>370/329 |
| 2023/0283597 | A1* | 9/2023 | Amar | H04W 12/069<br>726/26 |
| 2024/0303313 | A1* | 9/2024 | Paulraj | G06F 21/33 |

FOREIGN PATENT DOCUMENTS

| | | |
|---|---|---|
| CN | 116437353 | 7/2023 |
| EP | 2185065 | 1/2013 |
| JP | 2006085714 | 3/2006 |
| JP | 2011222010 | 11/2011 |
| JP | 2016032300 | 3/2016 |
| JP | 2016143396 | 8/2016 |
| TW | 200849920 | 12/2008 |
| TW | 201446067 | 12/2014 |

* cited by examiner

COMMUNICATION SYSTEM, REMOTE TERMINAL UNIT, AND AUTHENTICATION METHOD THEREOF FOR ESTABLISHING TRUSTED DEVICE

CROSS-REFERENCE TO RELATED APPLICATION

This application claims the priority benefit of Taiwan application serial no. 112144033, filed on Nov. 15, 2023. The entirety of the above-mentioned patent application is hereby incorporated by reference herein and made a part of this specification.

BACKGROUND

Technical Field

The disclosure relates to a device, and in particular to a communication system, a remote terminal unit, and an authentication method thereof.

Description of Related Art

In order to prevent the remote terminal unit (RTU) from being attacked by malicious programs or stealing data, how to ensure that the external input/output module is a trusted device is currently an important issue in the field. Although various communication security protocols have been developed in the communications field, effective authentication between devices still cannot be achieved, and whether the connected device is counterfeited and the data is stolen or modified also cannot be effectively verified.

SUMMARY

The disclosure provides a communication system, a remote terminal unit, and an authentication method thereof, which can effectively ensure that an external input/output module is a trusted device.

A remote terminal unit of the disclosure includes a processing module. The processing module includes a first processing unit and a first storage unit. The first storage unit is coupled to the first processing unit. In response to a trigger unit being enabled, the first processing unit operates in a provision mode to allow an input/output module and the processing module to establish trust. In response to the trigger unit being disabled, the first processing unit operates in a running mode to prohibit another input/output module that has not yet established trust from connecting with the processing module.

An authentication method of the disclosure is adapted to a remote terminal unit. The remote terminal unit includes a processing module. The authentication method includes the following steps. In response to a trigger unit being enabled, a first processing unit of the processing module operates in a provision mode to allow an input/output module and the processing module to establish trust. In response to the trigger unit being disabled, the first processing unit of the processing module operates in a running mode to prohibit another input/output module that has not yet established trust from connecting with the processing module.

A communication system of the disclosure includes a remote terminal unit and an extension device. The remote terminal unit includes a processing module. The extension device includes an input/output module and is coupled to the remote terminal unit. In response to a trigger unit of the processing module being enabled, the processing module operates in a provision mode to allow the input/output module and the processing module to establish trust. In response to the trigger unit being disabled, the processing module operates in a running mode to prohibit another input/output module that has not yet established trust from connecting with the processing module.

Based on the above, the communication system, the remote terminal unit, and the authentication method thereof can effectively establish trust with the input/output module.

In order for the features and advantages of the disclosure to be more comprehensible, the following specific embodiments are described in detail in conjunction with the drawings.

DESCRIPTION OF THE EMBODIMENTS

Figure 1:
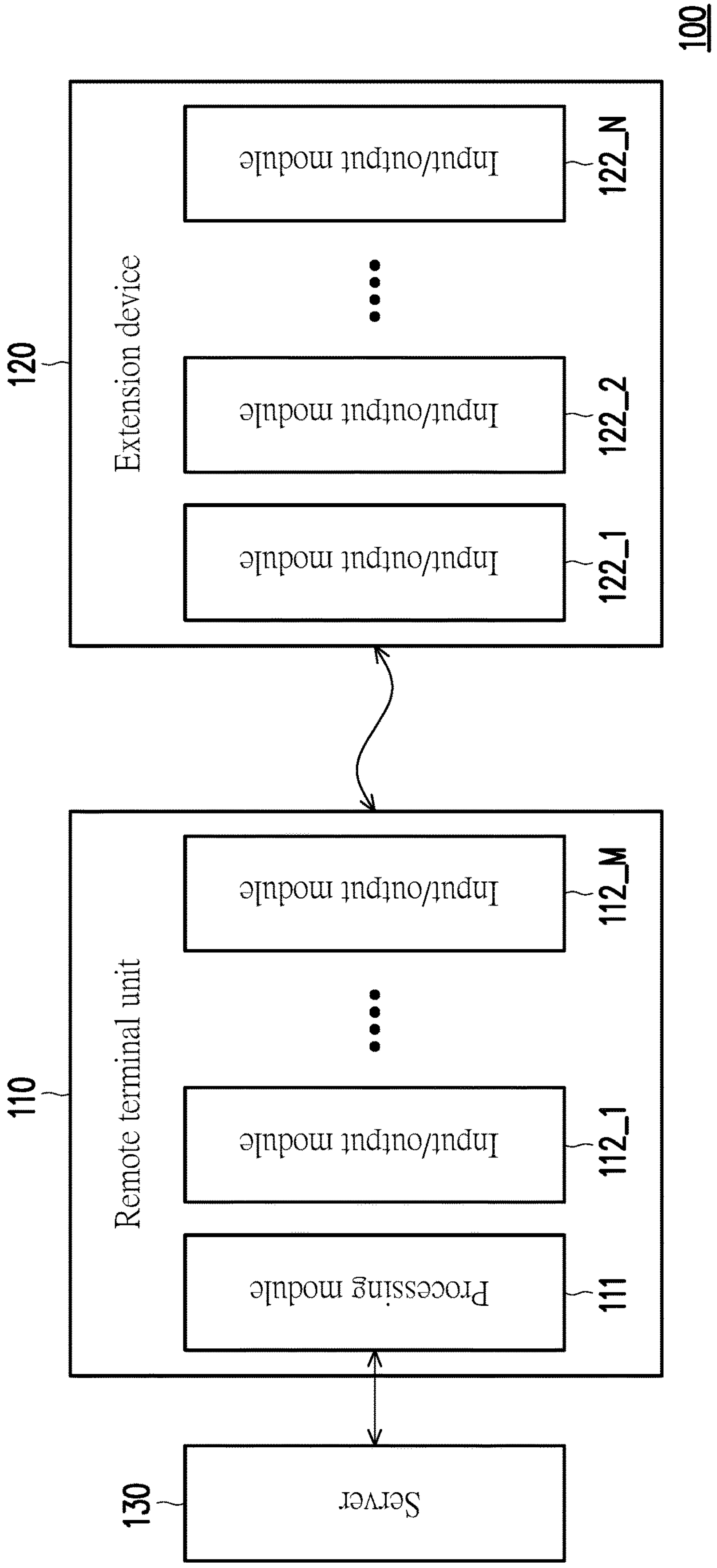
FIG. 1 is a schematic diagram of a communication system according to an embodiment of the disclosure.

Reference will now be made in detail to the exemplary embodiments of the disclosure, examples of which are illustrated in the drawings. Wherever possible, the same reference numerals are used in the drawings and the description to refer to the same or similar parts.

FIG. 1 is a schematic diagram of a communication system according to an embodiment of the disclosure. Referring to FIG. 1, a communication system 100 includes a remote terminal unit 110, an extension device 120, and a server 130. The remote terminal unit 110 includes a processing module 111 and multiple input/output (I/O) modules 112_1 to 112_M, where M is a positive integer. The remote terminal unit 110 may be coupled to the extension device 120 through a wired manner (for example, through a cable). The remote terminal unit 110 and the extension device 120 may be respectively disposed in different application fields with a considerable distance, but the disclosure is not limited thereto. The extension device 120 includes other input/output modules 122_1 to 122_N, where N is a positive integer. The extension device 120 may also be another remote terminal unit. The remote terminal unit 110 may be used to implement relevant applications of monitoring, control, or data collection.

In the embodiment, the processing module 111 may be used to manage, control, or monitor the input/output modules 112_1 to 112_M and 122_1 to 122_N and is connected to the server 130 through a wired or wireless manner. The processing module 111 may collect information respectively provided by the input/output modules 112_1 to 112_M and 122_1 to 122_N or send relevant information to the input/output modules 112_1 to 112_M and 122_1 to 122_N.

In the embodiment, the processing module 111 may include relevant processing and computing circuits including, for example, a central processing unit (CPU), but the disclosure is not limited thereto. The input/output modules 112_1 to 112_M and 122_1 to 122_N may respectively be different types of sensors, Internet of Things (IoT) devices, valve units, control units, and similar input/output units, but the disclosure is not limited thereto. In the embodiment, the input/output modules 112_1 to 112_M and 122_1 to 122_N may have a hot swapping function to be selectively installed into the remote terminal unit 110 or the extension device 120 when the remote terminal unit 110 (that is, the processing module 111) is in a running mode according to different usage states or selectively removed from the remote terminal unit 110 or the extension device 120.

Specifically, assuming that the input/output modules 112_1 to 112_M and 122_1 to 122_N and the processing module 111 have not yet established trust, when any one of the input/output modules 112_1 to 112_M and 122_1 to 122_N is temporarily installed into the remote terminal unit 110 or the extension device 120, the processing module 111 may establish trust with the one. Moreover, after a certain input/output module has established trust with the processing module 111 of the remote terminal unit 110, when the input/output module is installed into the remote terminal unit 110 or the extension device 120 at any time, the processing module 111 may automatically establish connection with the input/output module. In contrast, when the input/output module that has not established trust with the processing module 111 is installed into the remote terminal unit 110 or the extension device 120, the processing module 111 may effectively and immediately identify to directly reject the connection of the input/output module that has not established trust with the processing module 111.

Figure 2:
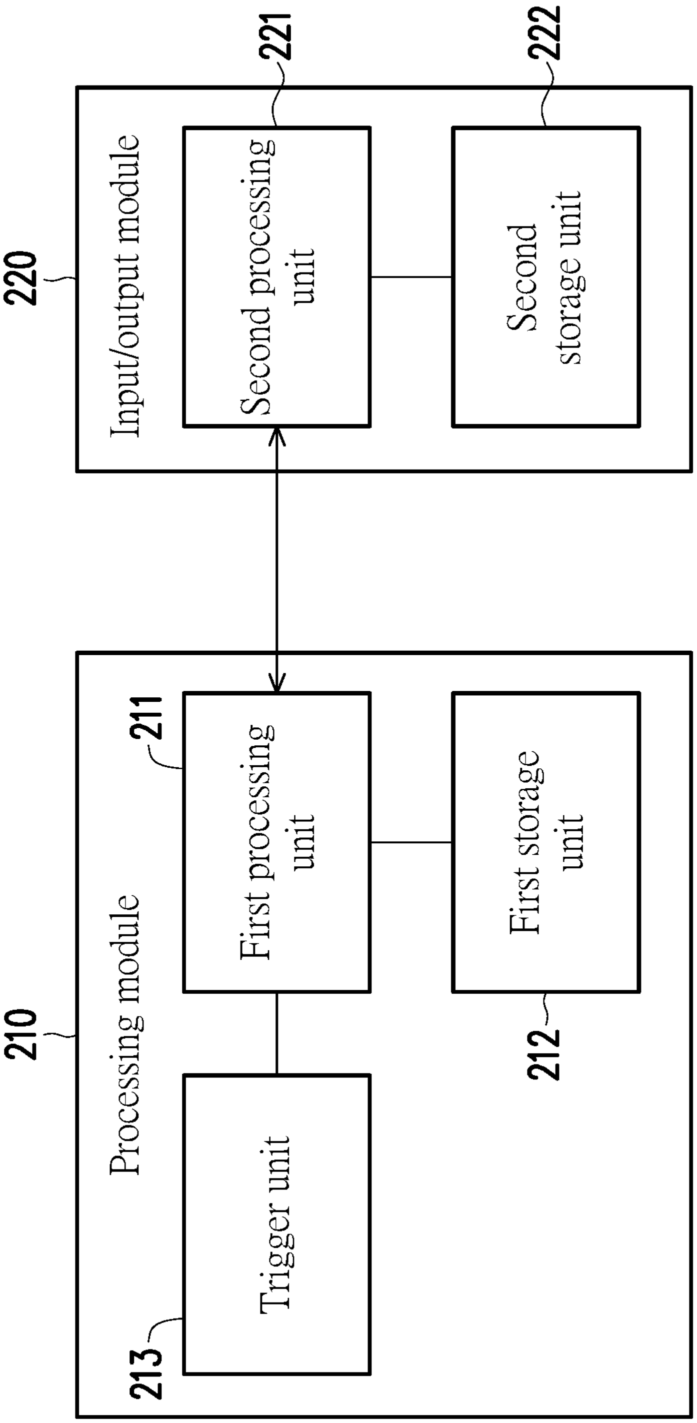
FIG. 2 is a schematic diagram of a processing module and an input/output module according to an embodiment of the disclosure.

FIG. 2 is a schematic diagram of a processing module and an input/output module according to an embodiment of the disclosure. Referring to FIG. 2, the processing module 111 of FIG. 1 may be implemented as a processing module 210 of the embodiment, and any of the input/output modules 112_1 to 112_M and 122_1 to 122_N of FIG. 1 may also be implemented as an input/output module 220 of the embodiment. In the embodiment, the processing module 210 includes a first processing unit 211, a first storage unit 212, and a trigger unit 213. The first processing unit 211 is coupled to the first storage unit 212 and the trigger unit 213. The input/output module 220 includes a second processing unit 221 and a second storage unit 222.

In the embodiment, the first processing unit 211 and the second processing unit 221 may respectively be, for example, a central processing unit (CPU), a graphics processing unit (GPU), other programmable general-purpose or specific-purpose microprocessors, digital signal processors (DSPs), programmable controllers, application specific integrated circuits (ASICs), programmable logic devices (PLDs), other similar processing units, or a combination of the units. In the embodiment, the first storage unit 212 and the second storage unit 222 may include, for example, flash memories, non-volatile random access memories (NVRAMs).

Figure 3:
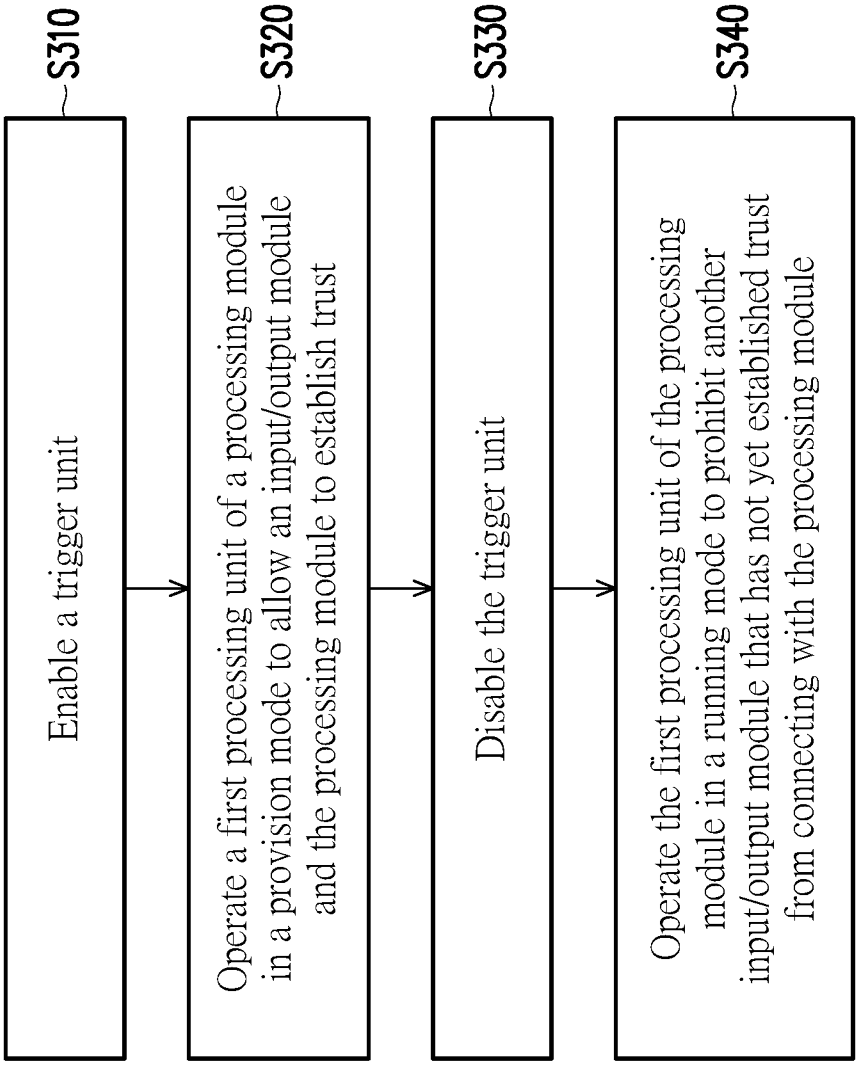
FIG. 3 is a flowchart of an authentication method of a remote terminal unit according to an embodiment of the disclosure.

FIG. 3 is a flowchart of an authentication method of a remote terminal unit according to an embodiment of the disclosure. Referring to FIG. 2 and FIG. 3, the processing module 210 may perform Steps S310 to S340 below. In Step S310, the trigger unit 213 may be enabled (or triggered). In Step S320, in response to the trigger unit 213 being enabled, the first processing unit 211 of the processing module 210 may operate in a provision mode to allow the input/output module 220 and the processing module 210 to establish trust. In Step S330, the trigger unit 213 may be disabled. In Step S340, in response to the trigger unit 213 being disabled, the first processing unit 211 of the processing module 210 may operate in a running mode to prohibit another input/output module that has not yet established trust from connecting with the processing module 210. In the running mode, the processing module 210 may communicate and transmit data with the input/output module 220 that has established trust.

In the embodiment, the trigger unit 213 is a physical button and is disposed in the processing module 210. In this regard, the remote terminal unit 110 shown in FIG. 1 may be, for example, deployed in a server room with high security. Alternatively, in an embodiment, the trigger unit 213 may be physically deployed in a facility with high security through external wiring to enhance protection through the server room with high security, but the disclosure is not limited thereto. In another embodiment, the trigger unit 213 may also be a virtual button and may be remotely operated to be enabled or disabled, for example, by a remote network interface or a network management tool.

Specifically, when the input/output module 220 is installed into the remote terminal unit 110 or the extension device 120 as shown in FIG. 1, since trust has not yet been established between the processing module 210 and the input/output module 220, the processing module 210 first prohibits the input/output module 220 from connecting with the processing module 210. Then, when a user enables the trigger unit 213 (by, for example, manually triggering the physical button or remotely operating through the virtual button), the processing module 210 and the input/output module 220 start to establish trust. In this way, the processing module 210 may implement a communication protection mechanism with high security, and in the case where the input/output module 220 is hot swapped, trust may be dynamically established according to an operation by the user. Moreover, how the processing module 210 establishes the trusted input/output module 220 will be described in detail in the following embodiments.

Figure 4:
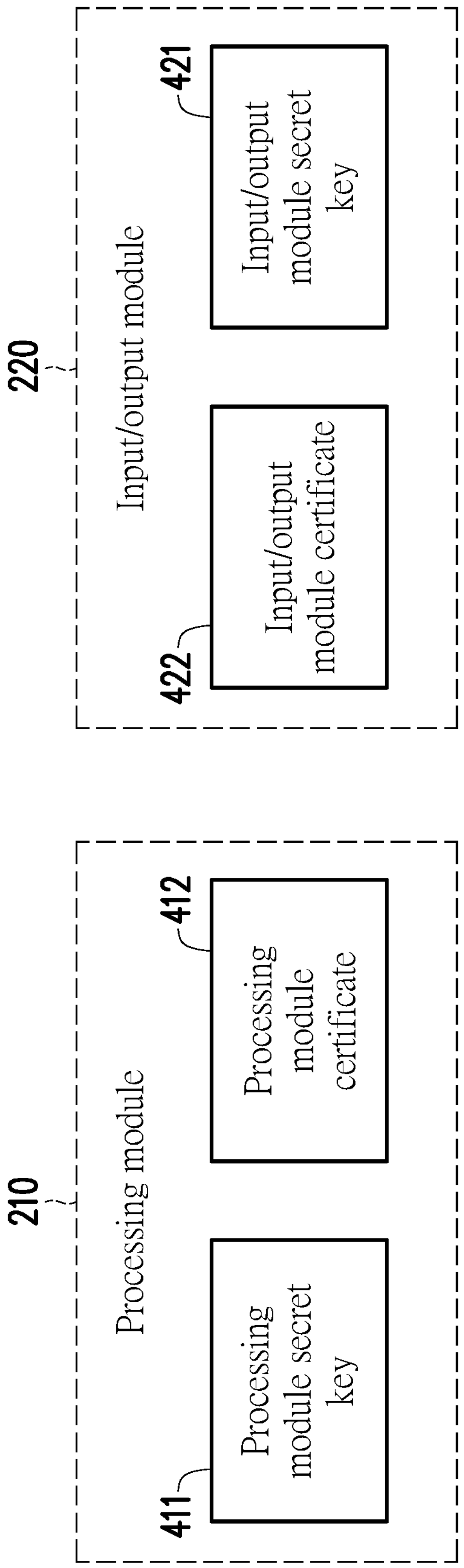
FIG. 4 is a schematic diagram of initialization according to an embodiment of the disclosure.

FIG. 4 is a schematic diagram of initialization according to an embodiment of the disclosure. Referring to FIG. 2 and FIG. 4, during a device initialization stage, the processing module 210 may establish a unique processing module secret key (private key) 411 and a unique processing module certificate 412, and store the processing module secret key 411 and the processing module certificate 412 into the first storage unit 212. The input/output module 220 may establish a unique input/output module secret key (private key) 421 and a unique input/output module certificate 422, and store the input/output module secret key 421 and the input/output module certificate 422 into the second storage unit 222. It should be noted that the processing module 210 and the input/output module 220 may respectively establish a random secret key and certificate, but the secret keys and the certificates established by different modules are all unique (that is, not repeated). In the embodiment, the processing module 210 may, for example, store the processing module secret key 411 into a secure storage space of the first storage unit 212, such as a specific area or a hardware security module (HSM) of a memory, but the disclosure is not limited thereto. The input/output module 220 may also store the input/output module secret key 421 into a secure storage space of the second storage unit 222.

Figure 5:
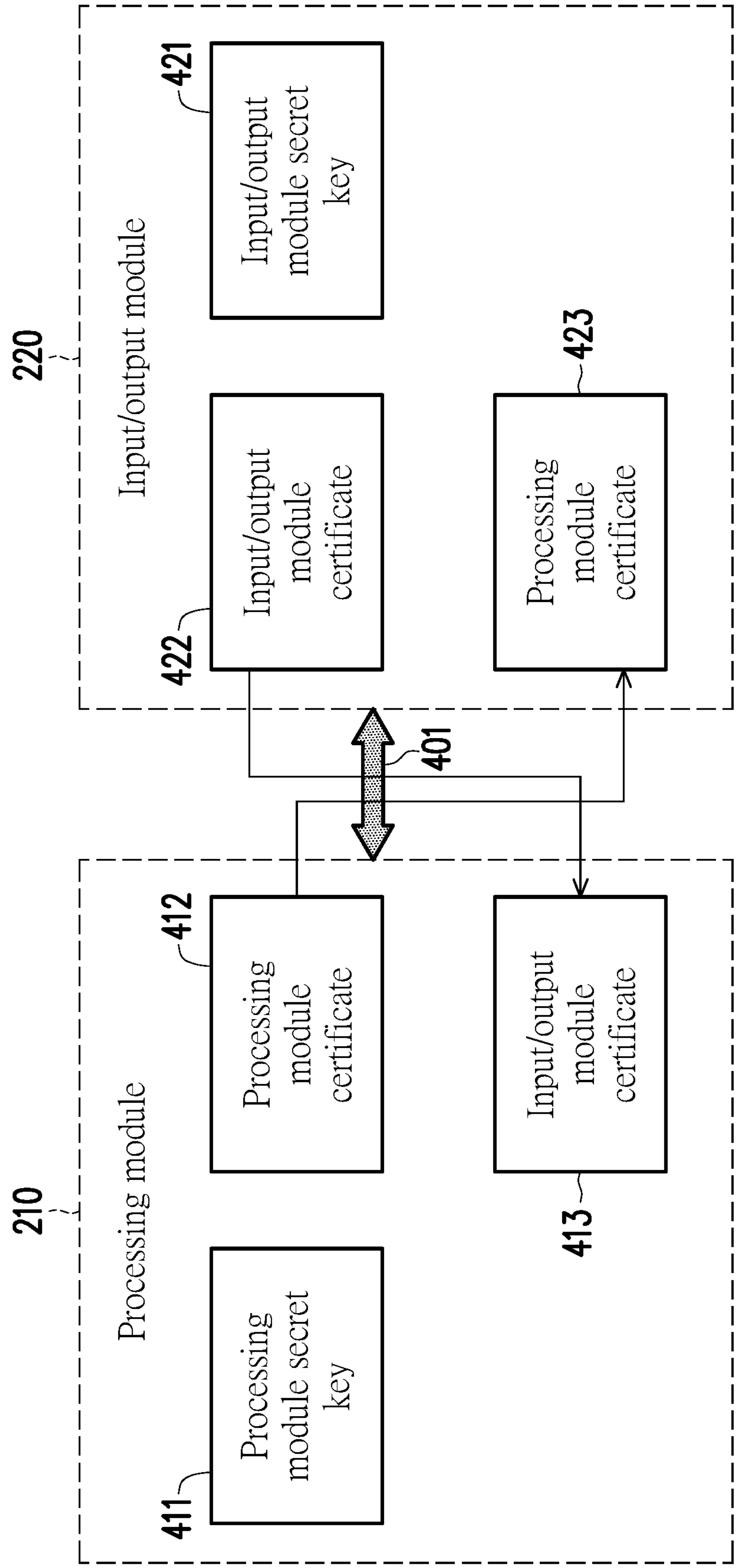
FIG. 5 is a schematic diagram of a provision mode according to an embodiment of the disclosure.

FIG. 5 is a schematic diagram of a provision mode according to an embodiment of the disclosure. Referring to FIG. 2 and FIG. 5, after the device initialization, when the trigger unit 213 is enabled, the first processing unit 211 of the processing module 210 operates in the provision mode. In the embodiment, the first processing unit 211 may send a notification signal to the input/output module 220, so that the processing module 210 and the input/output module 220 may obtain certificates of each other. The first processing unit 211 may send the notification signal to the input/output module 220 through a link layer discovery protocol (LLDP). In this regard, the notification signal may include organization-specific information of the link layer discovery protocol.

For example, the first processing unit 211 may adopt a custom LLDP type, such as an LLDP type 127, to configure relevant parameters in the notification signal. In other words, the data format of the notification signal may comply with the LLDP type 127, wherein the data format may include a destination address (DA), a source address (SA), an Ether type, a chassis identification (ID), a port ID, time to live (TTL), optional type-length-value (TLV), and end of LLDP data unit (DU) TLV. In this regard, the chassis ID, the port ID, the time to live, the optional TLV, and the end of LLDPDU TLV may have variable data lengths, and the first processing unit 211 may encrypt relevant data about the provision mode based on the basic TLV data format into the above data fields. In this way, when the second processing unit 221 of the input/output module 220 receives the notification signal with the data format, the second processing unit 221 may confirm that the first processing unit 211 operates in the provision mode and synchronously executes the provision mode.

In the embodiment, when the processing module 210 has notified the input/output module 220 to enter the provision mode, the processing module 210 and the input/output module 220 may obtain the certificates of each other. In this regard, the processing module 210 and the input/output module 220 may obtain the certificates of each other based on a mutual transport layer security (MTLS) communication protocol to establish trust, but the disclosure is not limited thereto. After the processing module 210 and the input/output module 220 establish trust, a communication connection 401 may be established. In the provision mode, the processing module 210 and the input/output module 220 may trust data transmitted by a handshake between the processing module 210 and the input/output module 220.

Figure 6:
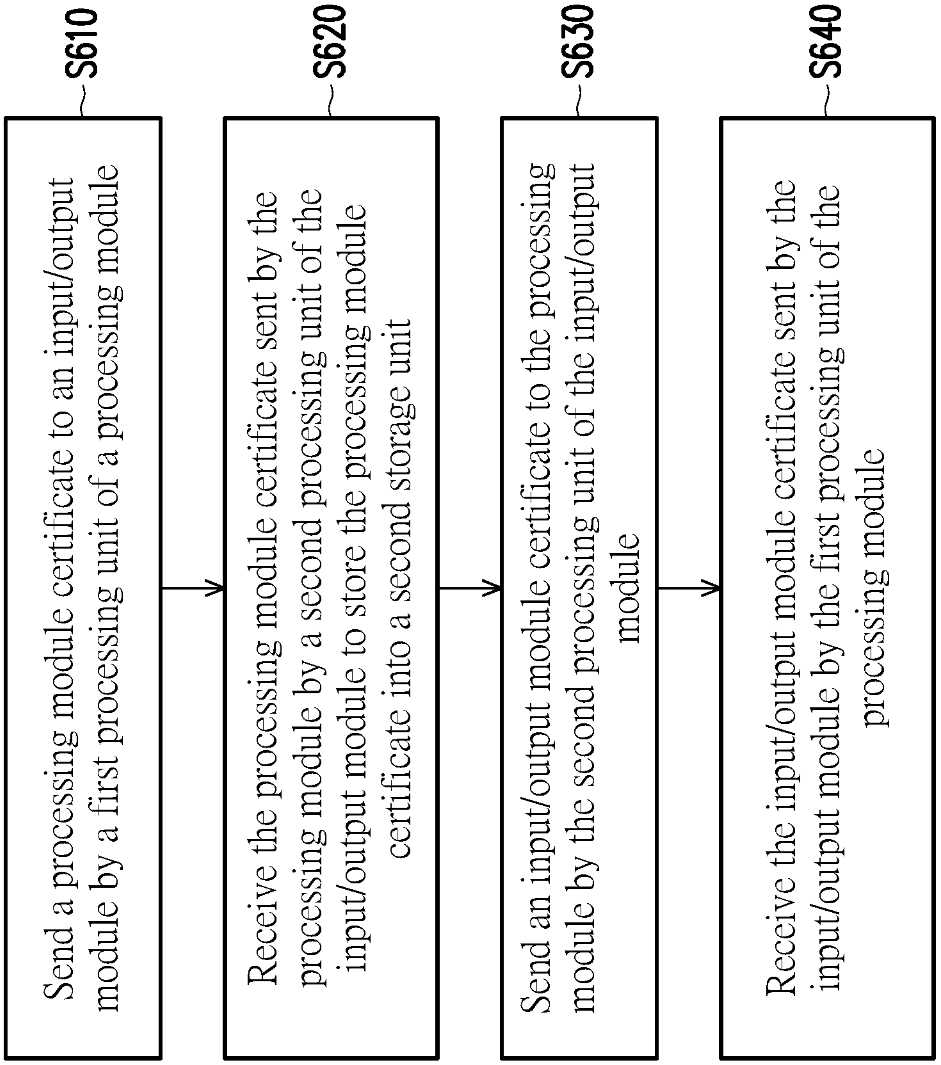
FIG. 6 is a flowchart of obtaining certificates of each other according to an embodiment of the disclosure.

FIG. 6 is a flowchart of obtaining certificates of each other according to an embodiment of the disclosure. Referring to FIG. 2, FIG. 5, and FIG. 6, the processing module 210 and the input/output module 220 may execute Steps S610 to S640 below. In Step S610, in the provision mode, the first processing unit 211 of the processing module 210 may send the processing module certificate 412 to the input/output module 220. In Step S620, the second processing unit 221 of the input/output module 220 may receive the processing module certificate 412 sent by the processing module 210 to store the processing module certificate 412 into the second storage unit 222, that is, processing module certificate 423 in FIG. 5. In Step S630, the second processing unit 221 of the input/output module 220 may send the input/output module certificate 422 to the processing module 210. In Step S640, the first processing unit 211 of the processing module 210 may receive the input/output module certificate 422 sent by the input/output module 220 to store the input/output module certificate 422 into the first storage unit 212, that is, input/output module certificate 413 in FIG. 5.

It is worth noting that the processing module 210 may also store multiple different input/output module certificates from different input/output modules into the second storage unit 222. Moreover, when the processing module 210 receives a new input/output module certificate sent again by an input/output module that has recorded a certificate, the processing module 210 may copy the new input/output module certificate into the first storage unit 212.

Figure 7:
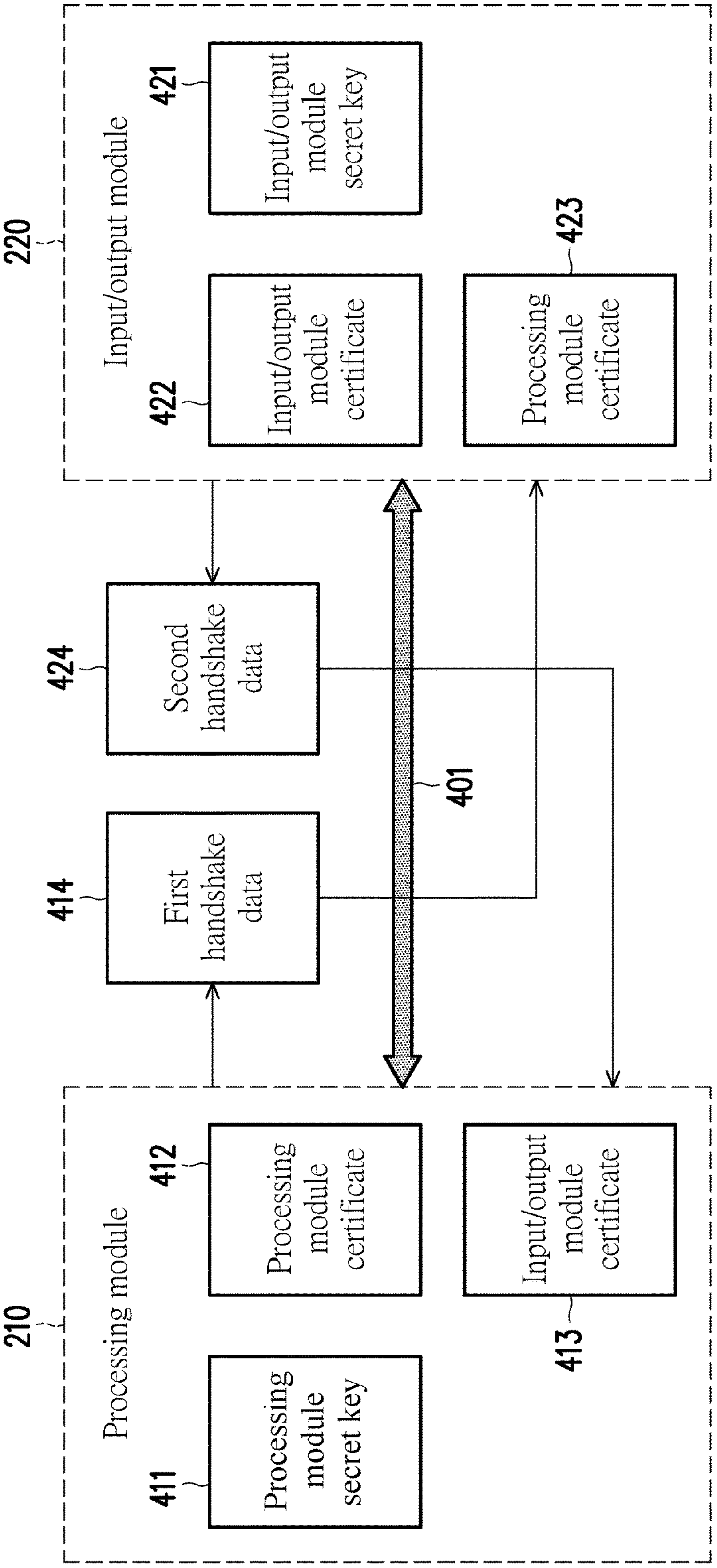
FIG. 7 is a schematic diagram of a running mode according to an embodiment of the disclosure.

FIG. 7 is a schematic diagram of a running mode according to an embodiment of the disclosure. Referring to FIG. 2 and FIG. 7, when the trigger unit 213 is disabled, the first processing unit 211 of the processing module 210 operates in the running mode. In the embodiment, certificate verification may be performed between the processing module 210 and the input/output module 220 based on a mutual transport layer security protocol. In this regard, the processing module 210 and the input/output module 220 perform handshaking to verify whether certificates of each other and respective pre-saved certificate pass the verification to establish the communication connection 401. In the embodiment, the manner of verifying whether the certificates of each other are the same as the respective pre-saved certificates may be, for example, by performing asymmetric key signature verification.

Figure 8:
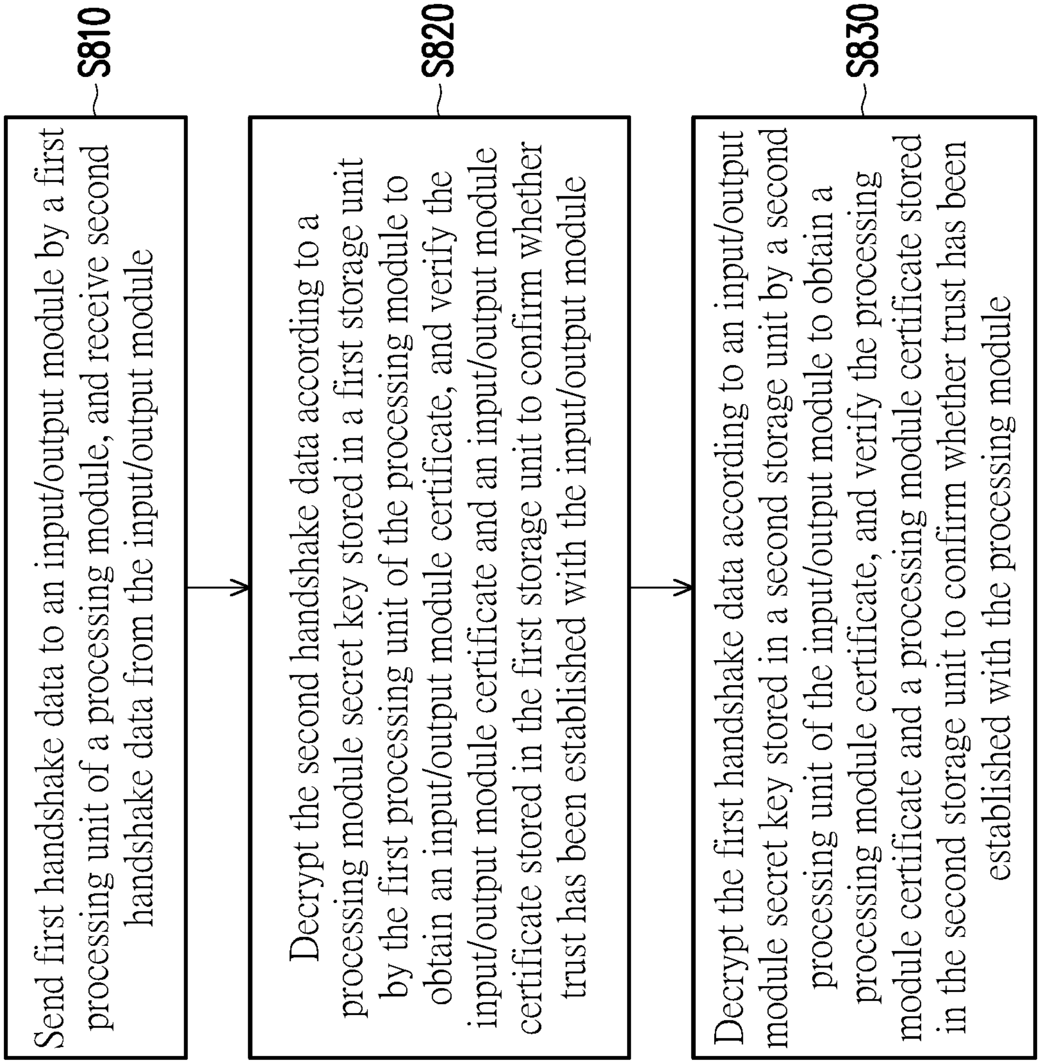
FIG. 8 is a flowchart of a handshaking procedure according to an embodiment of the disclosure.

FIG. 8 is a flowchart of a handshaking procedure according to an embodiment of the disclosure. Referring to FIG. 2, FIG. 5, and FIG. 6, the processing module 210 and the input/output module 220 may execute Steps S810 to S830 below. In Step S810, the first processing unit 211 of the processing module 210 may send first handshake data 414 to the input/output module 220, and receive second handshake data 424 from the input/output module 220. The first handshake data 414 may include the processing module certificate 412. The second handshake data 424 may include the input/output module certificate 422.

In Step S820, the first processing unit 211 of the processing module 210 may decrypt the second handshake data 424 according to the processing module secret key 411 stored in the first storage unit 212 to obtain the input/output module certificate 422, and verify the input/output module certificate 422 and the input/output module certificate 413 stored in the first storage unit 212 to confirm whether trust has been established with the input/output module 220. The first storage unit 212 of the processing module 210 may store multiple certificates corresponding to different input/output modules, and the first processing unit 211 of the processing module 210 may perform certificate search and verification operations according to the input/output module certificate 422. In this regard, if the input/output module certificate 422 and the input/output module certificate 413 pass the verification, the first processing unit 211 confirms that the input/output module 220 is a trusted device and may establish the communication connection 401. On the contrary, if the input/output module certificate 422 and the input/output module certificate 413 do not pass the verification, the first processing unit 211 prohibits (or rejects) the connection of the input/output module 220 with the processing module 210.

In Step S830, the second processing unit 221 of the input/output module 220 may decrypt the first handshake data 414 according to the input/output module secret key 421 stored in the second storage unit 222 to obtain the processing module certificate 412, and verify the processing module certificate 412 and the processing module certificate 423 stored in the second storage unit 222 to confirm whether trust has been established with the processing module 210. In this regard, if the processing module certificate 412 and the processing module certificate 423 pass the verification, the second processing unit 221 confirms that the processing module 210 is a trusted device and may establish the communication connection 401. In this way, the processing module 210 may communicate with the input/output module 220 with successfully obtained certificates of each other in the previous provision mode and may reject the connection of other input/output modules without successfully obtained certificates of each other.

In summary, the communication system, the remote terminal unit, and the authentication method of the disclosure can determine whether to establish trust with the hot swapped input/output module through operating the trigger unit with high security and can effectively ensure that the input/output module communicating with the processing module is a trusted device.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A remote terminal unit, comprising:

a processing module, comprising:

a first processor; and a first memory, coupled to the first processor, wherein in response to a trigger unit being enabled, the first processor operates in a provision mode to allow an input/output module and the processing module to establish trust, wherein in response to the trigger unit being enabled and the first processor operating in the provision mode, the first processor sends a notification signal to the input/output module, so that the processing module and the input/output module obtain certificates of each other, wherein in response to the trigger unit being enabled and the processing module and the input/output module operating in the provision mode, the first processor sends a processing module certificate to the input/output module, and receives an input/output module certificate sent by the input/output module to store the input/output module certificate into the first memory, and a second processor of the input/output module receives the processing module certificate sent by the processing module to store the processing module certificate into a second memory of the input/output module, wherein in response to the trigger unit being disabled, the first processor operates in a running mode to prohibit another input/output module that has not yet established trust from connecting with the processing module, wherein the trigger unit is a physical button and is disposed in the processing module, wherein in response to the first processor operating in the running mode, the first processor sends first handshake data to the input/output module and receives second handshake data from the input/output module, wherein the first processor decrypts the second handshake data according to a first secret key stored in the first memory, and verifies with the input/output module certificate stored in the first memory to confirm the input/output module is a trusted input/output module.

2. The remote terminal unit according to claim 1, wherein the first processor sends the notification signal to the input/output module through a link layer discovery protocol (LLDP).

3. The remote terminal unit according to claim 2, wherein the notification signal comprises an organization-specific information of the link layer discovery protocol.

4. The remote terminal unit according to claim 1, wherein the second processor of the input/output module decrypts the first handshake data according to a second secret key stored in the second memory, and verifies with the processing module certificate stored in the second memory to confirm the processing module is a trusted processing module.

5. The remote terminal unit according to claim 1, wherein the processing module and the input/output module obtain the certificates of each other based on a mutual transport layer security communication protocol to establish trust.

6. The remote terminal unit according to claim 1, wherein the remote terminal unit further comprises the input/output module.

7. The remote terminal unit according to claim 1, wherein the input/output module is disposed in an extension device.

8. An authentication method of a remote terminal unit, wherein the remote terminal unit comprises a processing module, the authentication method comprising:

in response to a trigger unit being enabled, operating a first processor of the processing module in a provision mode to allow an input/output module and the processing module to establish trust, wherein the trigger unit is a physical button and is disposed in the processing module, wherein in response to the trigger unit being enabled and the first processor operating in the provision mode, sending a notification signal to the input/output module by the first processor, so that the processing module and the input/output module obtain certificates of each other, wherein in response to the first processor operating in the running mode, sending first handshake data to the input/output module by the first processor of the processing module, and receiving second handshake data from the input/output module, and decrypting the second handshake data according to a first secret key stored in the first memory by the first processor of the processing module, and verifying with the input/output module certificate stored in the first memory to confirm the input/output module is a trusted input/output module, wherein the step of the processing module and the input/output module obtaining the certificates of each other comprises:

sending a processing module certificate to the input/output module by the first processor of the processing module;

receiving the processing module certificate sent by the processing module by a second processor of the input/output module to store the processing module certificate into a second memory of the input/output module;

sending an input/output module certificate to the processing module by the second processor of the input/output module; and receiving the input/output module certificate sent by the input/output module by the first processor of the processing module to store the input/output module certificate into a first memory of the processing module, and in response to the trigger unit being disabled, operating the first processor of the processing module in a running mode to prohibit another input/output module that has not yet established trust from connecting with the processing module.

9. The authentication method according to claim 8, wherein the first processor sends the notification signal to the input/output module through a link layer discovery protocol.

10. The authentication method according to claim 9, wherein the notification signal comprises organization-specific information of the link layer discovery protocol.

11. The authentication method according to claim 8, wherein in response to the first processor operating in the running mode, the authentication method further comprises:

decrypting the first handshake data according to a second secret key stored in the second memory by the second processor of the input/output module, and verifying with the processing module certificate stored in the second memory to confirm the processing module is a trusted processing module.

12. The authentication method according to claim 8, wherein the processing module and the input/output module obtain the certificates of each other based on a mutual transport layer security communication protocol to establish trust.

13. A communication system, comprising a remote terminal unit, comprising a processing module comprising a first processor and a first memory; and an extension device, comprising an input/output module and coupled to the remote terminal unit, wherein in response to a trigger unit of the processing module being enabled, the first processor operates in a provision mode to allow the input/output module and the processing module to establish trust, wherein in response to the trigger unit being enabled and the first processor operating in the provision mode, the first processor sends a notification signal to the input/output module, so that the processing module and the input/output module obtain certificates of each other, wherein in response to the trigger unit being enabled and the processing module and the input/output module operating in the provision mode, the first processor sends a processing module certificate to the input/output module, and receives an input/output module certificate sent by the input/output module to store the input/output module certificate into the first memory, and a second processor of the input/output module receives the processing module certificate sent by the processing module to store the processing module certificate into a second memory of the input/output module, wherein in response to the trigger unit being disabled, the first processor operates in a running mode to prohibit another input/output module that has not yet established trust from connecting with the processing module, wherein the trigger unit is a physical button and is disposed in the processing module, wherein in response to the first processor operating in the running mode, the first processor sends first handshake data to the input/output module and receives second handshake data from the input/output module, wherein the first processor decrypts the second handshake data according to a first secret key stored in the first memory, and verifies with the input/output module certificate stored in the first memory to confirm the input/output module is a trusted input/output module.

* * * * *